Feb. 19, 1952 — L. A. H. RUCH — 2,586,565
HOLDER FOR FEEDING AND WATERING CONTAINERS
Filed Oct. 31, 1949 — 2 SHEETS—SHEET 1
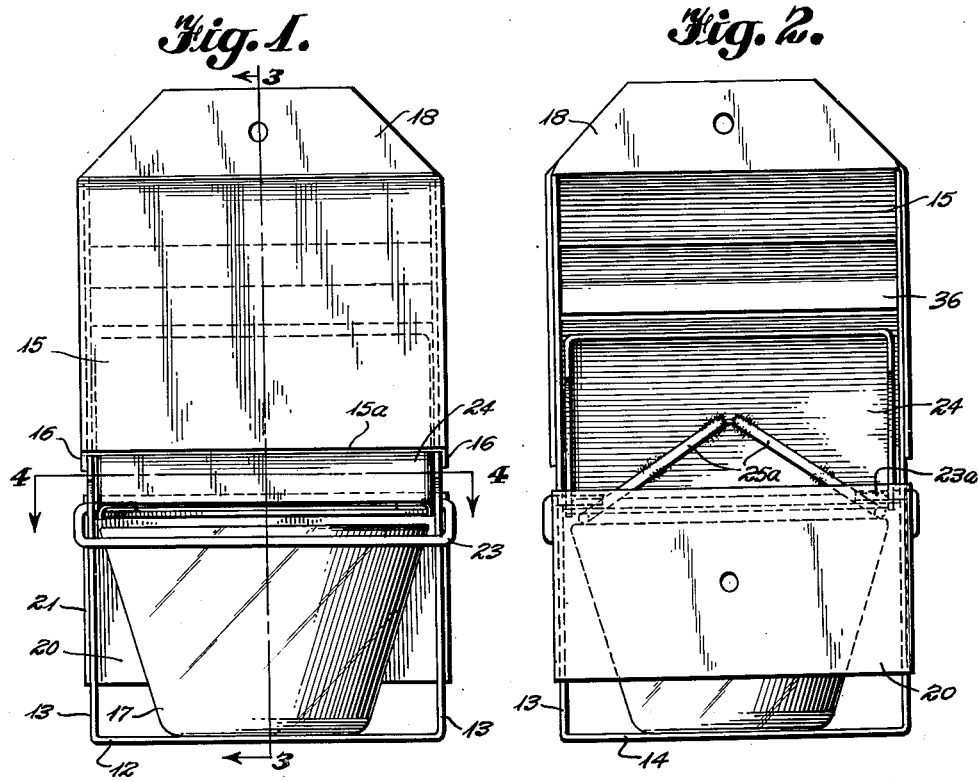
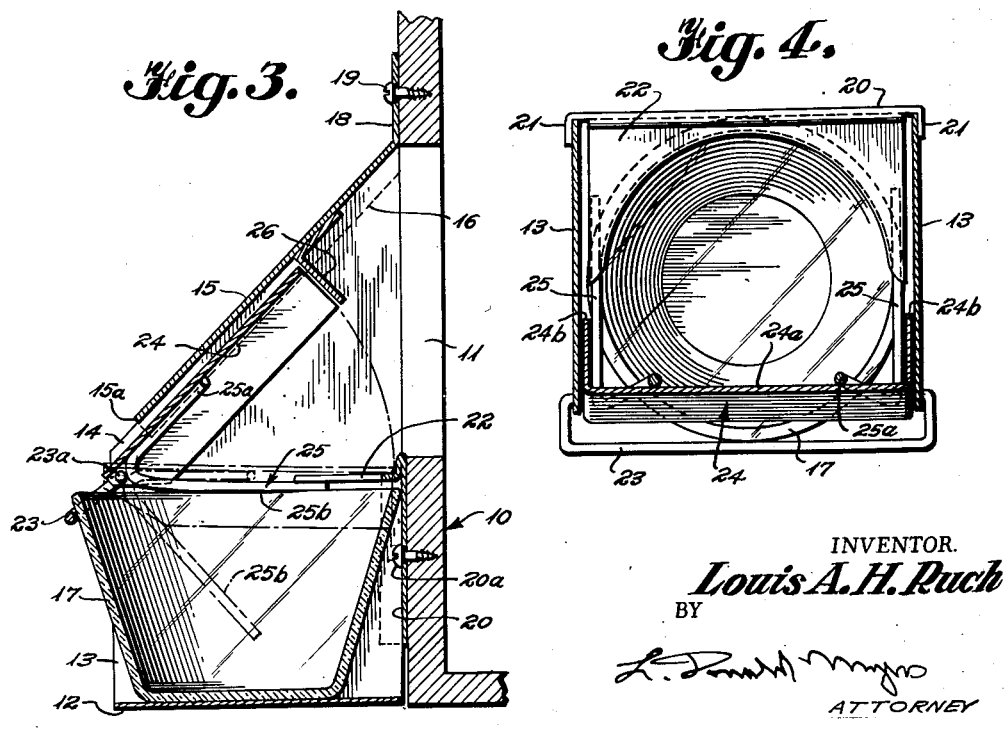
INVENTOR.
Louis A. H. Ruch
BY
ATTORNEY Feb. 19, 1952
L. A. H. RUCH
2,586,565
HOLDER FOR FEEDING AND WATERING CONTAINERS
Filed Oct. 31, 1949
2 SHEETS—SHEET 2
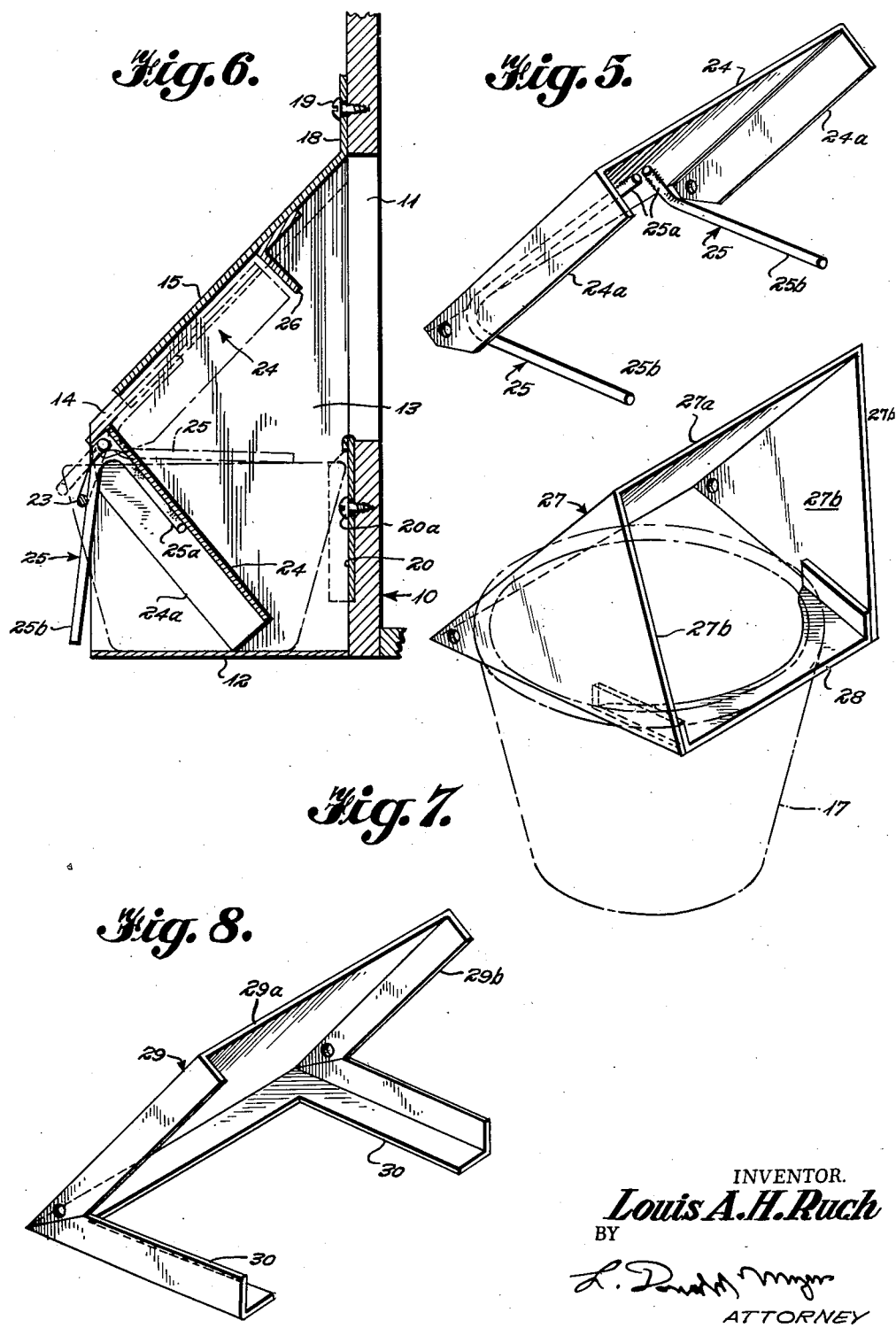
INVENTOR.
Louis A. H. Ruch
BY
ATTORNEY Patented Feb. 19, 1952

2,586,565

UNITED STATES PATENT OFFICE 2,586,565

HOLDER FOR FEEDING AND WATERING CONTAINERS

Louis A. H. Ruch, Paterson, N. J.

Application October 31, 1949, Serial No. 124,548

6 Claims. (Cl. 119—63)

This invention relates to new and useful improvements in devices for feeding and watering small animals, such as chinchillas, rabbits, or the like, reared in pens, and deals more specifically with holders for the containers employed for supplying feed and water to such animals.

It is the primary object of this invention to provide a holder for containers, employed for feeding and watering small animals, which are more efficient in the utilization of the attendant's time because of the ease with which the containers may be placed in and removed from the holder by the attendant without the necessity of entering the pen.

Another important object of the invention is the provision of a holder for small animal feeding and watering containers which is so constructed and associated with a wall of a pen that the attendant, operating from the exterior of the pen, may very easily and quickly remove and insert containers without danger of releasing the confined animals during the substitution period when no container occupies the holder.

A further object of the invention is to provide a feeding and watering container holder to be mounted on the exterior of the pen wall in proper operative relation to an opening formed in said wall through which an animal may stick its head to obtain the contents of the container, and with the holder having an opening in an exterior wall thereof through which containers may be inserted and removed, and through which a container positioned in the holder may be refilled without removal.

Still another object of the invention is to provide a feeding and watering container holder with an escape preventing flap which is so constructed and mounted in the holder that it will be arranged in an inoperative position, when a container is in the holder, to permit an animal to have access to the contents of the container and will be arranged in an operative position, when no container is in the holder, to prevent an animal from escaping from the pen through the holder.

Other objects and advantages of the invention are to provide a feeding and watering container holder with an escape preventing flap that is moved into an inoperative position by a container when the latter is inserted in the holder and is allowed to gravitate into an operative position when the container is removed; to provide such a holder with a shield for the escape preventing flap which will function when the flap is in its inoperative position to prevent an animal from pulling on the flap; to provide a bail for retaining the container in the holder against displacement by an animal; and to provide a guard which will prevent an animal from chewing on the edge of a container positioned in the holder.

In the accompanying drawings forming a part of this specification and in which like numerals are employed to designate like parts throughout the same, Figure 1 is an outside elevational view of a feeding and watering container holder embodying this invention, Figure 2 is an inside elevational view of the holder illustrated in Fig. 1, Figure 3 is a vertical sectional view taken on line 3—3 of Fig. 1, Figure 4 is a horizontal sectional view taken on line 4—4 of Fig. 1, Figure 5 is a detail perspective view of the escape preventing flap which is illustrated in Figs. 1 to 4, inclusive, Figure 6 is a vertical sectional view, similar to Fig. 3, which illustrates a slightly modified form of holder, Figure 7 is a detail perspective view of a modified form of escape preventing flap to the one illustrated in Fig. 5, and Fig. 8 is a detail perspective view of a further modified form of escape flap.

In the drawings, wherein for the purpose of illustration are shown the preferred embodiments of this invention, and first particularly referring to Fig. 3, the reference character 10 designates a side wall of any suitable form of pen for confining small animals. This wall is provided with an opening 11 through which an animal, desiring to obtain feed or water, may stick its head. The feed and water container holder embodying this invention is attached to the exterior of the pen wall 10 in operative relative to the opening 11.

The container holder illustrated in Figs. 1 to 4, inclusive, includes a housing that is preferably formed of any sheet material, such as metal or plastic, from which the housing parts can be pressed or molded. The major portion of the housing preferably is formed of one piece of sheet material that is so shaped as to provide the bottom wall 12 and the two parallel end walls 13. The upper edges 14 of these parallel end walls are best illustrated in Fig. 3 as sloping downwardly and outwardly to have suitably attached thereto the combined, inclined top and outer wall 15. This latter wall is provided with edge flanges 16 which may be suitably connected, either by spot welding, soldering, or the like, to the upper edge portions of the end walls 13.

It will be noted by particularly considering Figs. 1 and 3 that the bottom end 15a of the combined top and outer wall 15 terminates sufficiently above the bottom wall 12 to provide an outer opening through which the feed or water container 17 may be inserted and removed. Figs. 1, 2 and 3 illustrate the combined top and outer wall 15 as having an attaching flange 18 which is suitably apertured to receive a screw, or other fastening means, 19 for mounting the holder on the exterior of the pen 10.

The inner wall of the housing is partially closed by an inner wall 20 formed with end flanges 21 which may be spot welded, soldered, or the like, to the inner edge portions of the end walls 13 for connecting these several walls. The inner wall 20 is apertured to accommodate the additional fastening screw 20a. Figs. 2, 3 and 4 clearly illustrate the top edge 20a of the inner wall 20 as terminating in suitable spaced relation to the top edge of the combined wall 15 to provide the housing with an inner opening that registers with the opening 11 formed in the wall 10 of the animal confining pen. Consequently, an animal is permitted to stick its head through the registering openings of the pen and holder walls to obtain access to the feed or water in the container 17.

Figs. 3 and 4 illustrate the inner wall 20 of the housing as being provided with a guard 22 which overlies the inner edge portion of the container 17 and functions to prevent an animal from chewing or biting the top edge portion of the container. This guard 22 is permanently attached to the housing wall 20 and remains stationary.

For the purpose of retaining a container 17 in the housing, against displacement by a confined animal, a gravity actuated bail 23 is pivotally connected at its opposite ends to the end walls 13 of the holder housing. This bail 23 is formed of a suitable length of wire so shaped that its end extremities 23a may pass inwardly through apertures formed in the end walls 13 of the housing for providing the pivotal mounting for the bail. By particularly considering Figs. 1 and 3, it will be seen that after a container 17 is inserted in the housing of the holder, the bail 23 may drop into position to engage the outer edge portion of the container to prevent displacement of the container by an animal confined in the pen. To permit insertion or removal of a container, the attendant need only lift the bail.

So long as a container 17 is positioned within the housing of the holder and is held against displacement by the bail 23, an animal will be prevented from escaping through the holder. However, it is necessary to prevent the escape of an animal through the holder during periods when no container is positioned in the holder. To accomplish this desired result, an escape preventing flap 24 is pivotally mounted in the holder.

This flap preferably is formed of the same sheet material as the housing and is best illustrated in Figs. 2, 3, 4 and 5 as including a flat, main body portion 24a having end flanges 24b. The lower or outer side of this flap 24 is pivotally connected to the end walls 13 of the holder housing by the inwardly extending ends 23a of the bail 23. In other words, these bail ends perform the dual function of pivotally connecting both the bail and the escape preventing flap to the end walls of the holder housing.

This escape preventing flap 24 should be caused to occupy the raised, inoperative position, illustrated in unbroken lines in Figs. 1 to 4, inclusive, when a container 17 is positioned within the holder housing so that an animal may have access to the contents of the container. However, when a container is removed from the housing, the escape preventing flap 24 should fall by gravity so that it will rest on the container guard 22 and will thereby bridge the interior of the housing between the inner and outer wall openings.

To bring about this desired operation of the escape preventing flap 24, it is provided with two actuating arms 25. The mounting portions 25a of these actuating arms are suitably soldered, or otherwise secured, to the undersurface of the main body 24a of the flap. The free or projecting portions 25b of these actuating arms are arranged at an acute angle with reference to the plane of the main body of the flap and are so positioned that they will be engaged by the container 17 when the latter is inserted through the outer opening of the holder housing. The container 17, therefore, will move the escape preventing flap from its lowered, operative position, shown in broken lines in Fig. 3, to its raised, inoperative position, shown in full lines in Fig. 3, when the container is inserted in the holder housing. When the container is withdrawn, the escape preventing flap will drop by gravity to its operative position where it will rest on the container guard 22. In this operative position, the free portions 25b of the actuating arms will occupy the broken line position of Fig. 3 where they will be in a position to be engaged by a container 17 being inserted through the outer opening of the holder housing.

To prevent an animal from pulling on the escape preventing flap 24 when it occupies its raised or inoperative position, an angular shield 26 is attached to the under surface of the inclined, combined top and inner wall 15. This shield overlies the upper or inner side of the escape flap when the latter is raised.

Fig. 6 illustrates a slight modification of the holder disclosed in Figs. 1 to 5, inclusive. In this modification, the container guard 22 is eliminated with the result that the escape preventing flap 24 will be permitted to drop to an operative position with its end flanges 24b resting on the bottom wall 12 of the holder housing. The free portions 25b of the flap operating arms 25 then will be positioned in the outer opening of the housing in readiness to be engaged by a container when the latter is inserted in the holder housing. Otherwise, this modification is the same as that illustrated in Figs. 1 to 5, inclusive, and, for that reason, the same reference numerals will be applied to corresponding parts.

Fig. 7 is intended to illustrate a modification of the escape preventing flap illustrated in Figs. 1 to 6, inclusive. This flap 27 includes a main body portion 27a that is integral with triangularly shaped end walls or flanges 27b. These end walls or flanges take the place of the actuating arms 25 and are positioned relative to the main body portion 27a so that they will converge slightly toward their lower corners. This converging arrangement causes the lower edges of the end walls or flanges 27b to engage the upper edge of the container 17. In this modification, the container guard 28 is permanently fastened to the inner corner portions of the flap actuating arms or walls 27b so as to move with the escape preventing flap.

This modified form of combined escape preventing flap and container guard will function in the same manner as the flap illustrated in Fig. 6. That is to say, when the flap is arranged in its operative position, it will drop into engagement with and will rest on the bottom wall 12 of the holder housing.

Fig. 8 discloses a further modified form of escape preventing flap. In this modification, the flap and its actuating arms are formed from a single piece of sheet material. This flap 29 includes a main body portion 29a formed with end flanges 29b. At its outer side, the main body 29a is integrally formed with the actuating portion that includes the angular arm members 30.

This modified escape preventing flap 29 will function like the flap of Figs. 1 to 5, inclusive, if a container guard 22 is attached to the inner wall 20 of the holder housing. If no such container guard is provided, this flap 29 will function like the flap illustrated in Fig. 6.

By particularly considering Figs. 3, 6 and 7, it will be seen that when a container 17 is positioned in the holder housing, a portion of its outer edge will project beyond the lower side of the main body of the escape preventing flap so that water or feed may be poured into the container without necessitating its removal from the holder housing.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. A holder for animal feeding and watering containers, comprising a housing having a first vertical wall with an opening in its upper portion to admit the head of and animal and a second wall, opposite said first wall, with an opening therein, positioned below the level of the opening in said first wall, for the insertion and removal of the feeding and watering container, a substantially flat flap positioned in the housing for preventing the escape of an animal through the housing when the container is removed, means pivotally connecting one edge portion of said flap to the housing for movement between a lowered position with the flap bridging the interior of the housing between the openings in said first and second walls and a raised position substantially out of alinement with said openings, and actuating means rigidly connected to the pivoted edge portion of, and extending across the housing at an acute angle to, said flap and engaging the container, when inserted, to move the flap to and hold it in its raised position.

2. A holder for animal feeding and watering containers, comprising a housing having a first vertical wall with an opening in its upper portion to admit the head of an animal and a second wall, opposite said first wall, with an opening therein, positioned below the level of the opening in said first wall, for the insertion and removal of the feeding and watering container, a substantially flat flap positioned in the housing for preventing the escape of an animal through the housing when the container is removed, means pivotally connecting one edge portion of said flap to the housing for movement between a lowered position with the flap bridging the interior of the housing between the openings in said first and second walls and a raised position substantially out of alinement with said openings, actuating means rigidly connected to the pivoted edge portion of, and extending across the housing at an acute angle to, said flap, and a feeding and watering container inserted in the housing through the opening in the second wall and engaging the actuating means to move the flap to and hold it in its raised position.

3. A holder for animal feeding and watering containers, comprising a housing having a first vertical wall with an opening in its upper portion to admit the head of an animal and a second wall, opposite said first wall, with an opening therein, positioned below the level of the opening in said first wall, for the insertion and removal of the feeding and watering container, a substantially flat flap positioned in the housing for preventing the escape of an animal through the housing when the container is removed, a gravity actuated bail-like stop positioned outside the housing at the upper margin of the opening in the second wall for retaining the container in the housing, means for pivotally connecting the ends of the said stop to the housing and also one edge portion of said flap to the housing for movement between a lowered position with the flap bridging the interior of the housing between the openings in said first and second walls and a raised position substantially out of alinement with said openings, and actuating means rigidly connected to the pivoted edge portion of, and extending across the housing at an acute angle to, said flap and engaging the container, when inserted, to move the flap to and hold it in its raised position.

4. A holder for animal feeding and watering containers, comprising a housing having a first vertical wall with an opening in its upper portion to admit the head of an animal and a second wall, opposite said first wall, with an opening therein, positioned below the level of the opening in said first wall, for the insertion and removal of the feeding and watering container, a substantially flat flap positioned in the housing for preventing the escape of an animal through the housing when the container is removed, a gravity actuated bail-like stop positioned outside the housing at the upper margin of the opening in the second wall for retaining the container in the housing, means for pivotally connecting the ends of the said stop to the housing and also one edge portion of said flap to the housing for movement between a lowered position with the flap bridging the interior of the housing between the openings in said first and second walls and a raised position substantially out of alinement with said openings, a pair of actuating arms rigidly connected to the pivoted edge portion of, and extending across the housing at an acute angle to, said flap, and a feeding and watering container inserted in the housing through the opening in the second wall and engaging the pair of actuating arms to move the flap to and hold it in its raised position.

5. A holder for animal feeding and watering containers, comprising a housing having a first vertical wall with an opening in its upper portion to admit the head of an animal and a second wall, opposite said first wall, with an opening therein, positioned below the level of the opening in said first wall, for the insertion and removal of the feeding and watering container, a container guard attached to the first wall at the lower margin of its opening and extending into the housing over the adjacent edge of the container positioned in the housing, a substantially flat flap positioned in the housing for preventing the escape of an animal through the housing when the container is removed, means pivotally connecting one edge portion of said flap to the housing for movement between a lowered position resting on said container guard with the flap bridging the interior of the housing between the openings in said first and second walls and a raised position substantially out of alinement with said openings, and actuating means rigidly connected to the pivoted edge portion of, and extending across the housing at an acute angle to, said flap and engaging the container, when inserted, to move the flap to and hold it in its raised position.

6. A holder for animal feeding and watering containers, comprising a housing having a first vertical wall with an opening in its upper portion to admit the head of an animal and a second wall, opposite said first wall, with an opening therein, positioned below the level of the opening in said first wall, for the insertion and removal of the feeding and watering container, a container guard attached to the first wall at the lower margin of its opening and extending into the housing over the adjacent edge of the container positioned in the housing, a substantially flat flap positioned in the housing for preventing the escape of an animal through the housing when the container is removed, a gravity actuated bail-like stop positioned outside the housing at the upper margin of the opening in the second wall for retaining the container in the housing, means for pivotally connecting the ends of the said stop to the housing and also one edge portion of said flap to the housing for movement between a lowered position resting on said container guard with the flap bridging the interior of the housing between the openings in said first and second walls and a raised position substantially out of alinement with said openings, and actuating means rigidly connected to the pivoted edge portion of, and extending across the housing at an acute angle to, said flap and engaging the container, when inserted, to move the flap to and hold it in its raised position.

LOUIS A. H. RUCH.

REFERENCES CITED

The following references are of record in the file of this patent:

UNITED STATES PATENTS

| Number | Name | Date |
|---|---|---|
| 11,592 | Abbe | Aug. 29, 1854 |
| 385,756 | Hollingsworth | July 10, 1888 |
| 928,560 | Stewart | July 20, 1902 |